US012669239B1

(12) United States Patent
Tan

(10) Patent No.: US 12,669,239 B1
(45) Date of Patent: Jun. 30, 2026

(54) QUICK ELECTRICAL CONNECTION STRUCTURE FOR CONTROLLER, CONTROLLER, AND LAMP

(71) Applicant: Dongguan Haiyue Intelligent Technology Co., Ltd, Dongguan (CN)

(72) Inventor: Huishi Tan, Shenzhen (CN)

(73) Assignee: Dongguan Haiyue Intelligent Technology Co., Ltd, Dongguan (CN)

( * ) Notice: Subject to any disclaimer, the term of this patent is extended or adjusted under 35 U.S.C. 154(b) by 0 days.

(21) Appl. No.: 19/286,433

(22) Filed: Jul. 31, 2025

(30) Foreign Application Priority Data

May 29, 2025 (CN) ......................... 202521087548.4

(51) Int. Cl.
*F21V 23/06* (2006.01)
*F21V 17/06* (2006.01)
*F21V 23/00* (2015.01)
*H01R 13/24* (2006.01)
*H01R 13/625* (2006.01)

(52) U.S. Cl.
CPC .............. *F21V 23/06* (2013.01); *F21V 17/06* (2013.01); *F21V 23/004* (2013.01); *H01R 13/2407* (2013.01); *H01R 13/2471* (2013.01); *H01R 13/625* (2013.01)

(58) Field of Classification Search
CPC ... H01R 33/9456; F21V 23/004; F21V 23/06; F21V 17/06
See application file for complete search history.

(56) References Cited

U.S. PATENT DOCUMENTS 8,267,570 B2 * 9/2012 Lai .......................... H01R 33/96
362/651
11,029,011 B2 * 6/2021 Li ......................... H01R 13/506

FOREIGN PATENT DOCUMENTS

CN 208093797 U 11/2018
CN 208723107 U 4/2019
CN 220934834 U 5/2024

OTHER PUBLICATIONS

Innovation Q+NPL Search (Year: 2026).*

* cited by examiner

*Primary Examiner* — Anabel Ton
(74) *Attorney, Agent, or Firm* — Nitin Kaushik

(57) ABSTRACT

Disclosed in the application is a quick electrical connection structure for a controller, including: a connection cover, mounted on the controller, where a first PCB is mounted in the controller and is provided with a plurality of connecting pins, a connecting post is integrally connected to the middle of one side of the connection cover, and the plurality of connecting pins penetrate through the bottom of the connecting post and extend outward. According to the application, the controller can be quickly mounted and disassembled using a unique snap-fit structure where connecting snap blocks fit with connecting snap slots.

10 Claims, 5 Drawing Sheets

QUICK ELECTRICAL CONNECTION STRUCTURE FOR CONTROLLER, CONTROLLER, AND LAMP

CROSS-REFERENCE TO RELATED APPLICATIONS

The application claims priority to Chinese patent application No. 2025210875484, filed on May 29, 2025, the entire contents of which are incorporated herein by reference.

TECHNICAL FIELD

The present application relates to the technical field of controllers, and in particular, to a quick electrical connection structure for a controller, a controller, and a lamp.

BACKGROUND

Existing lamps are generally mounted with controllers, such as lighting controllers (sensors) and human proximity controllers (human proximity sensors), and the controller is usually connected by means of welding, insertion, or other fixed connection methods. These connection methods have the following problems:

1) inconvenient mounting and disassembly: the welding method requires professional welding equipment and operators, and once welded, the controller is difficult to disassemble for repair or replacement;
2) insufficient connection reliability: the conventional connection method easily causes looseness due to factors such as vibration and temperature changes during long-term use, thereby affecting normal operation of the controller; and
3) poor compatibility: customized connection solutions are often required between different types of controllers and lamps, making it difficult to achieve universality.

SUMMARY

An objective of the present application is to provide a quick electrical connection structure for a controller, a controller, and a lamp.

The controller can be quickly mounted and disassembled, thereby improving the mounting and maintenance efficiency.

To achieve the above objective, the following technical solutions are adopted:

A quick electrical connection structure for a controller, including:

a connection cover, mounted on the controller, where a first PCB is mounted in the controller and is provided with a plurality of connecting pins, a connecting post is integrally connected to the middle of one side of the connection cover, and the plurality of connecting pins penetrate through the bottom of the connecting post and extend outward; and a base, where the top of the base is provided with a connecting cavity adapted to the connecting post, a second PCB is further arranged in the connecting cavity and is further provided with a plurality of elastic contact pads, a plurality of connecting snap slots are circumferentially formed in an inner wall of the connecting cavity, a plurality of connecting snap blocks adapted to the connecting snap slots are arranged on an outer wall of the connecting post, the connecting post is inserted into the connecting cavity and snaps into the base via the connecting snap blocks and the connecting snap slots, and when the connection cover snaps into the base via the connecting post, an end part of one end of each of the plurality of connecting pins that penetrate through the bottom of the connecting post abuts against one of the clastic contact pads.

Further, each of the connecting snap slots includes a first snap-fit slot formed vertically on an inner wall thereof and a second snap-fit slot formed circumferentially and horizontally in the inner wall thereof along an inner wall of the connecting cavity; and the second snap-fit slot is in communication with the first snap-fit slot, and one end of the first snap-fit slot penetrates to the top of the connecting cavity so as to form a first notch.

Further, the bottom of the first notch is an inclined surface that slopes downward toward the interior of the connecting cavity; and an inner wall of one side of the first snap-fit slot is an arc surface that protrudes outward.

Further, a snap protruding block extends downward from an inner wall of the top of the second snap-fit slot.

Further, the number of the connecting snap blocks is at least two, and the size of one of the connecting snap blocks is greater than the sizes of other connecting snap blocks.

Further, the top of the base is further provided with a fool-proof block, and the fool-proof block is arranged close to the connecting snap slot adapted to the connecting snap block with the large size.

Further, a bolt stud is integrally connected to the middle of the bottom of the base, and the connecting cavity is formed in the bolt stud; an outer wall of the bolt stud is further mounted with a washer and a lock nut; and a connecting cable is further connected to the second PCB, and the connecting cable penetrates through the bottom of the bolt stud and extends outward.

A controller, including a mounting housing, where the controller further includes the connection cover and the base as above; and the connection cover is mounted or integrated on the mounting housing.

A lamp, including a lamp housing and the controller as above, where the base is mounted on the lamp housing, and the controller is mounted on the base via the connection cover.

A lamp, including a lamp housing, and the base and the connection cover as above, where the base is integrated on the lamp housing, and the connection cover is mounted or integrated on the controller; and the base and the connection cover are connected using the electrical connection structure as above.

With the above solutions, the present application has the following beneficial effects:

1) The connection structure for a controller in the present application includes a connection cover mounted on the controller and a base mounted on the lamp. The connection cover can quickly snap into the base via the connecting snap blocks and the connecting snap slots, facilitating mounting and disassembly. Meanwhile, after the controller is mounted on the base via the connection cover, the end part of one end of each of the connecting pins on the controller can directly abut against the corresponding clastic contact pad to achieve an electrical connection.
2) The elastic contact pads are made of an elastic material. When the connecting pins abut against the elastic contact pads, the elastic contact pads undergo appropriate elastic deformation, thereby increasing the contact area and contact pressure with the connecting pins, and ensuring low resistance and stability of the electrical connection. Meanwhile, the surfaces of the elastic contact pads are coated to further enhance conductivity and corrosion resistance.

3) The controller can be quickly mounted and disassembled using a unique snap-fit structure where the connecting snap blocks fit with the connecting snap slots. Meanwhile, a fool-proof structure is provided, which can achieve precise circumferential and axial positioning of an interface, thereby avoiding misalignment during connection.

4) The connection structure is applicable to various types of controllers and lamps, has good universality and compatibility, can meet the requirements of different application scenarios, and has strong practicability.

DESCRIPTION OF REFERENCE SIGNS

1, connection cover; 2, connecting pin; 3, base; 11, connecting post; 12, connecting snap block; 31, connecting cavity; 32, second PCB; 33, elastic contact pad: 34, connecting snap slot; 35, snap-fit protruding block; 36, fool-proof block; 37, bolt stud; 38, connecting cable; 39, washer; 30, lock nut; 341, first snap-fit slot; 342, second snap-fit slot; 343, first notch; 4, first PCB; 5, lamp housing; and 6, mounting housing.

DETAILED DESCRIPTION OF THE EMBODIMENTS

The present application is described in detail below in conjunction with the accompanying drawings and specific embodiments.

Figure 1:
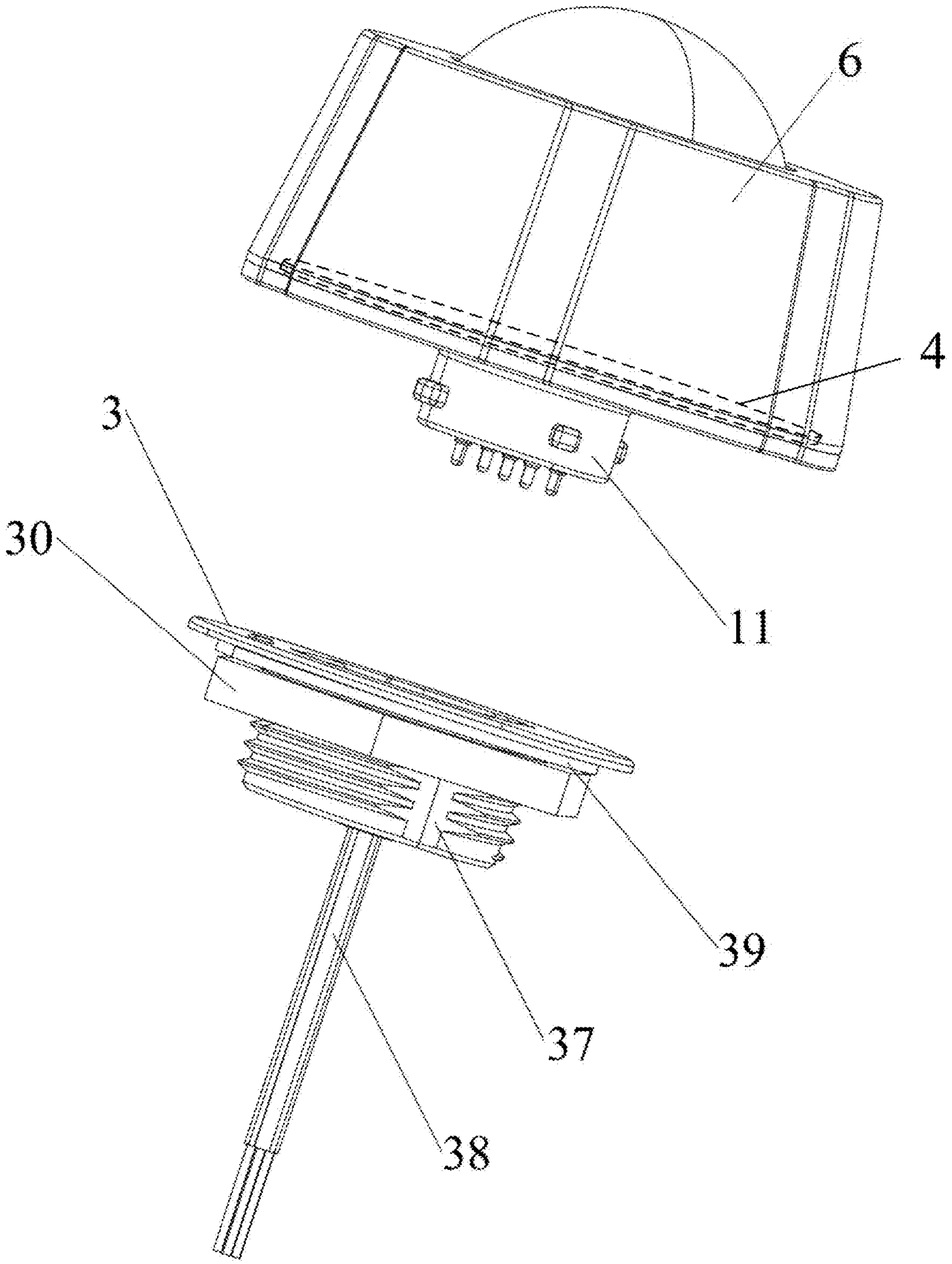
FIG. 1 is a schematic structural diagram of the present application.
Figure 2:
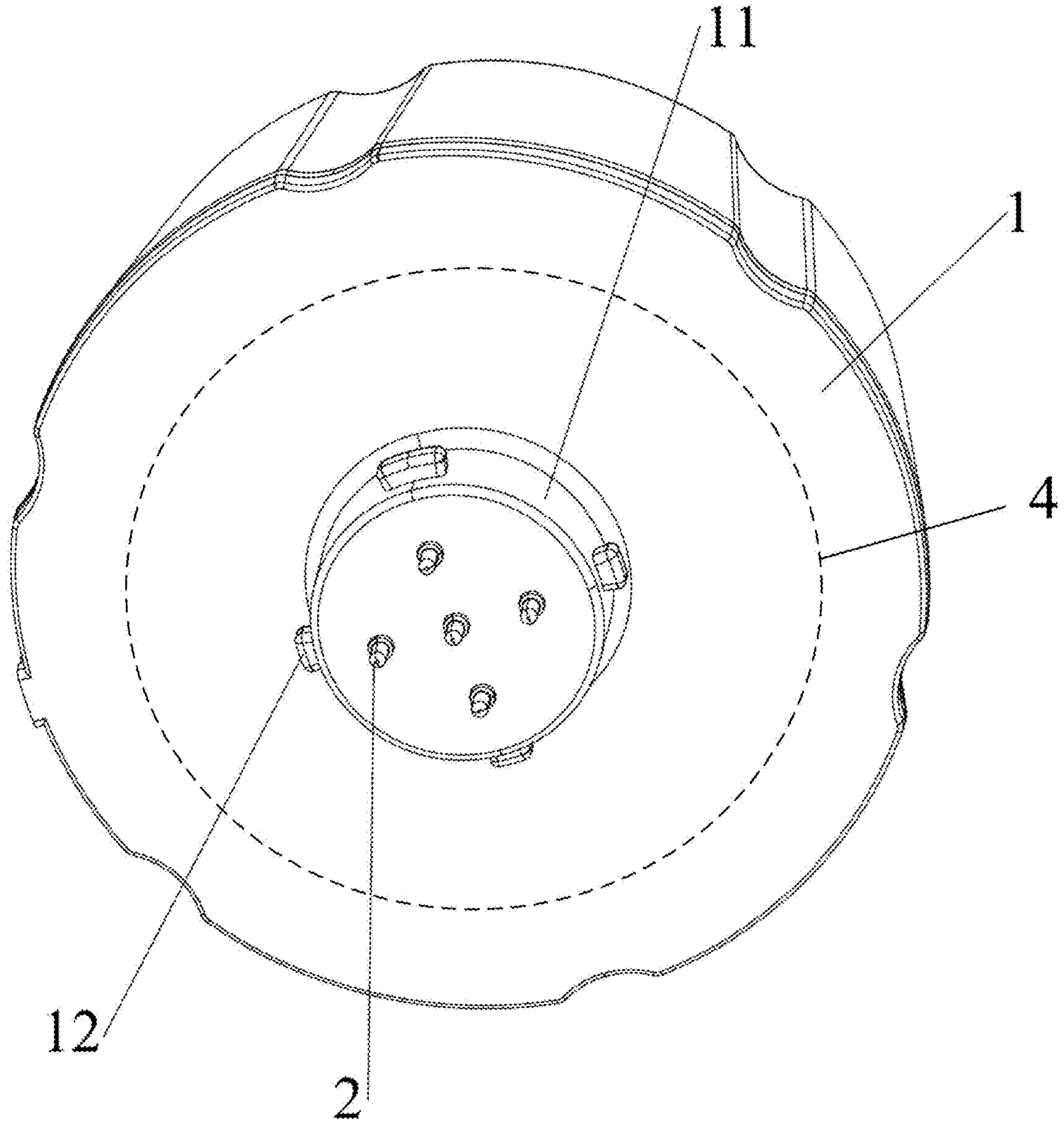
FIG. 2 is a schematic structural diagram of a connection cover in the present application.
Figure 3:
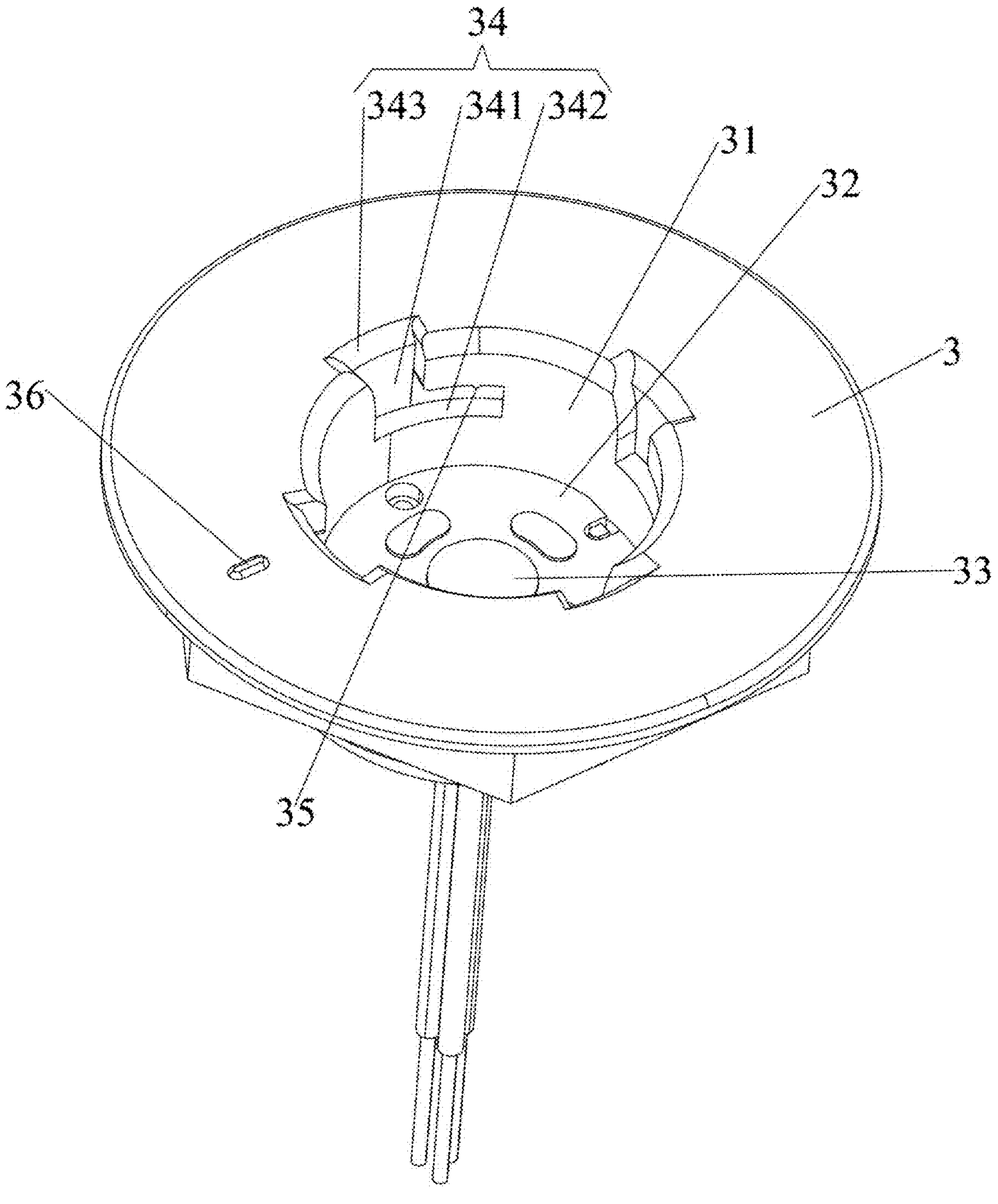
FIG. 3 is a schematic structural diagram of a base in the present application.
Figure 4:
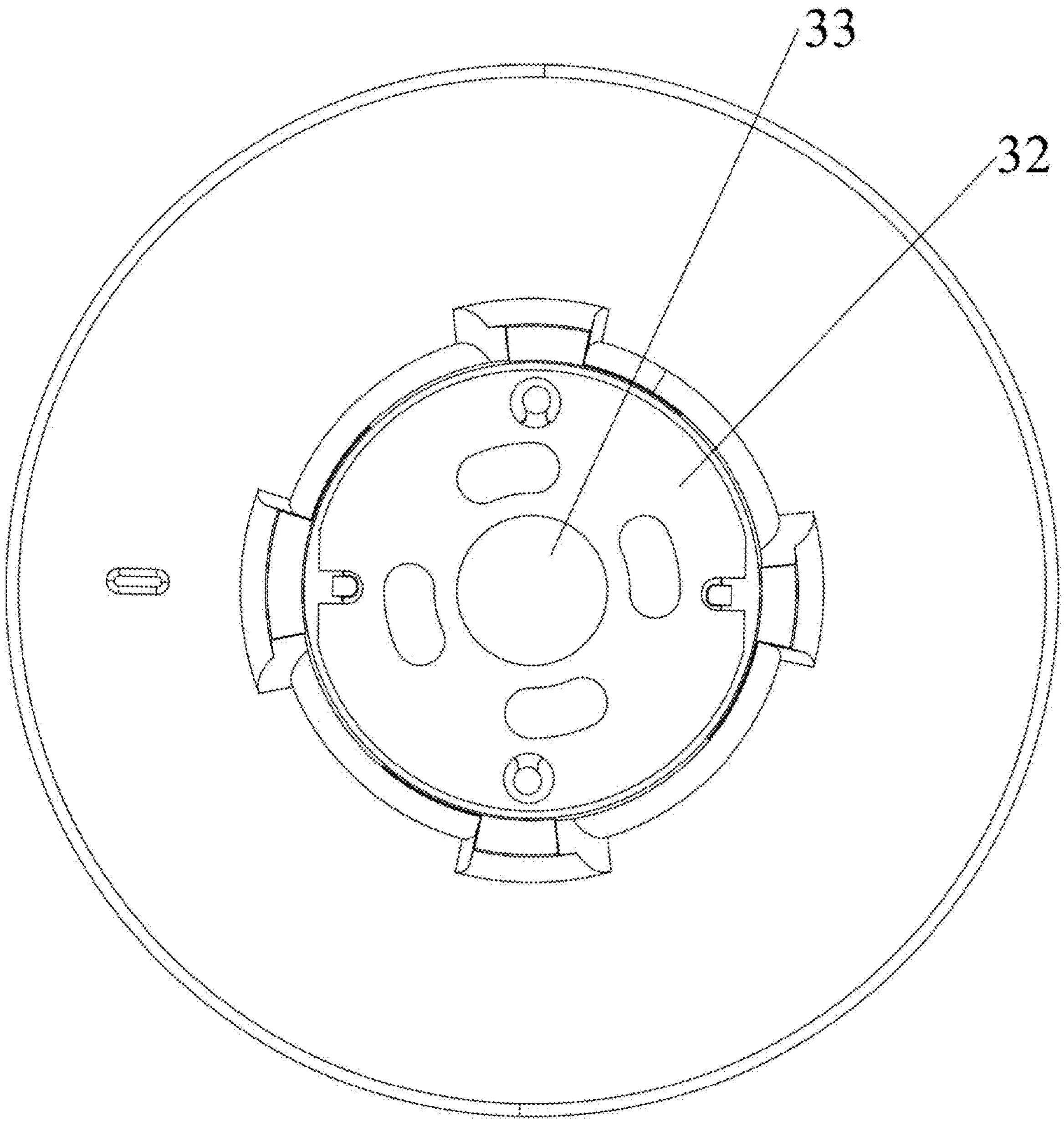
FIG. 4 is a top view of the present application.
Figure 5:
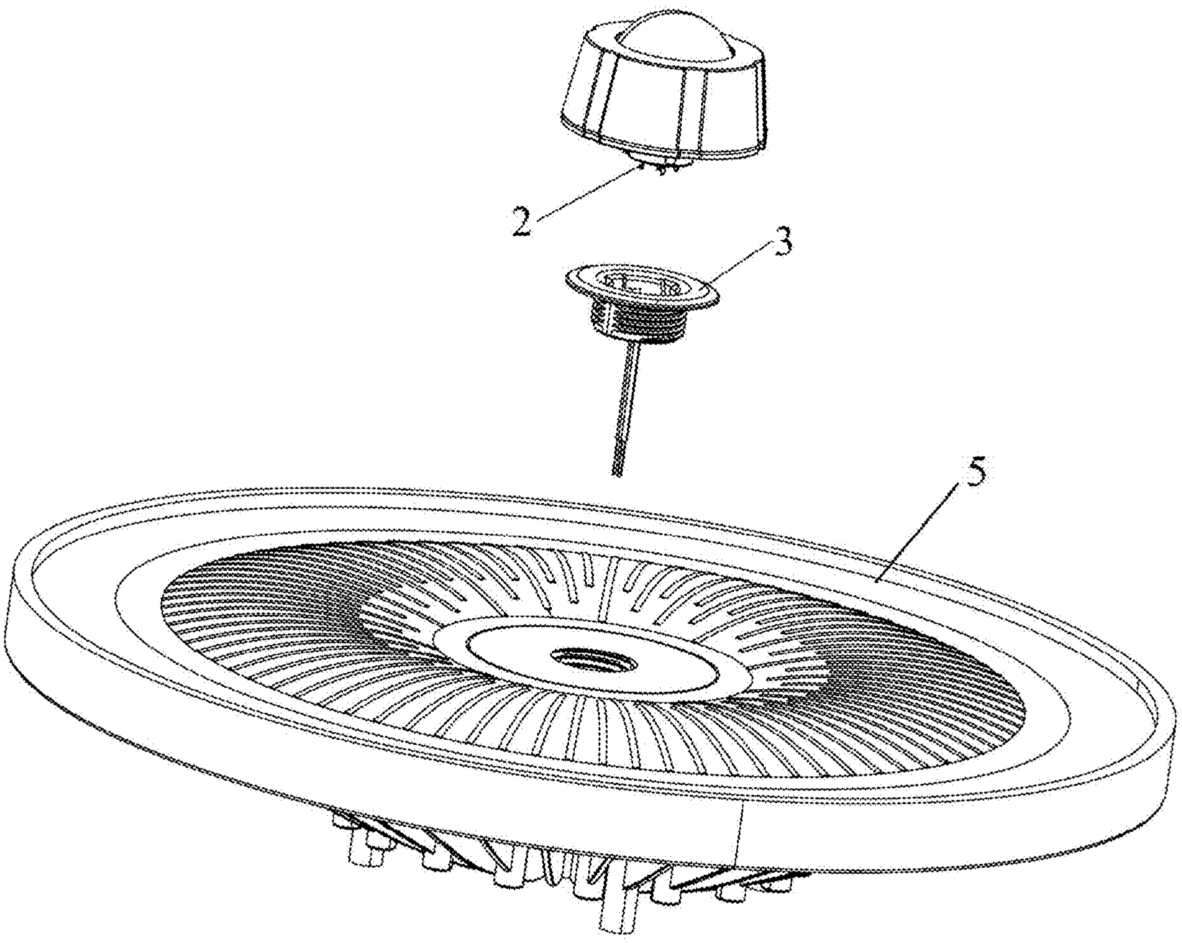
FIG. 5 is an exploded view of the present application mounted on a lamp.

Referring to FIGS. 1 to 5, the present application provides a quick electrical connection structure for a controller, which, in an embodiment, includes:

a connection cover 1, mounted on the controller, where a first PCB 4 is mounted in the controller and is provided with a plurality of connecting pins 2, a connecting post 11 is integrally connected to the middle of one side of the connection cover 1, and the plurality of connecting pins 2 penetrate through the bottom of the connecting post 11 and extend outward; and a base 3, where the top of the base 3 is provided with a connecting cavity 31 adapted to the connecting post 11, a second PCB 32 is further arranged in the connecting cavity 31 and is further provided with a plurality of elastic contact pads 33, a plurality of connecting snap slots 34 are circumferentially formed in an inner wall of the connecting cavity 31, a plurality of connecting snap blocks 12 adapted to the connecting snap slots 34 are arranged on an outer wall of the connecting post 11, the connecting post 11 is inserted into the connecting cavity 31 and snaps into the base 3 via the connecting snap blocks 12 and the connecting snap slots 34, and when the connection cover 1 snaps into the base 3 via the connecting post 11, an end part of one end of each of the plurality of connecting pins 2 that penetrate through the bottom of the connecting post 11 abuts against one of the elastic contact pads 33.

In this embodiment, the connection cover 1 is mounted at the bottom of the controller and is used as a bottom cover of the controller. The base 3 is mounted on a lamp (the second PCB 32 in the base 3 is connected to a main control board of the lamp). The connection cover 1 can quickly snap into the base 3 via the connecting snap blocks 12 and the connecting snap slots 34, making mounting and disassembly more convenient. Meanwhile, after the controller is mounted on the base 3 via the connection cover 1, the end part of one end of each of the connecting pins 2 on the controller can directly abut against the corresponding elastic contact pad 33 to achieve an electrical connection (i.e., the first PCB 4 in the controller is electrically connected to the main control board in the lamp via the connecting pins 2, the elastic contact pads 33, and the second PCB 32, thereby providing the lamp with a sensing function). In this embodiment, the types of the controller (such as a lighting sensor and a human proximity sensor) and the lamp are not limited. The quick electrical connection structure has good universality and compatibility, and can meet the requirements of different application scenarios.

Further, in this embodiment, two oppositely arranged positioning blocks are arranged in the connecting cavity 31, and positioning notches are formed in positions of an edge of the second PCB 32 that correspond to the positioning blocks. Through the positioning blocks and the positioning notches, the second PCB 32 can be quickly arranged in the connecting cavity 31. Meanwhile, screw holes are formed in the second PCB 32, and corresponding hole positions are correspondingly provided in the connecting cavity 31. After the second PCB 32 is arranged in the connecting cavity 31, screws can be locked into the screw holes to fasten and fix the second PCB 32. At the same time, the numbers and distributed arrangement positions of the elastic contact pads 33 and the connecting pins 2 are not limited in the present application. In a preferred embodiment, the numbers of the elastic contact pads 33 and the connecting pins 2 are set to five, one of the elastic contact pads 33 is in a circular structure and is located in the middle of the top of the second PCB 32, and the other four elastic contact pads 33 are in a waist-shaped structure and are arranged around the elastic contact pads 33 with the circular structure. Such a shape design can increase the area of the elastic contact pads 33 to facilitate full contact with the connecting pins 2. Moreover, the elastic contact pads 33 are made of an elastic material. When the connecting pins 2 abut against the elastic contact pads 33, the elastic contact pads 33 undergo appropriate elastic deformation, thereby increasing the contact area and contact pressure with the connecting pins 2, and ensuring low resistance and stability of the electrical connection. In addition, the surfaces of the elastic contact pads 33 are coated to further enhance conductivity and corrosion resistance.

In an embodiment, the connecting snap slot 34 includes a first snap-fit slot 341 formed vertically on an inner wall thereof and a second snap-fit slot 342 formed circumferentially and horizontally in the inner wall thereof along an inner wall of the connecting cavity 31; and the second snap-fit slot 342 is in communication with the first snap-fit slot 341, and one end of the first snap-fit slot 341 penetrates to the top of the connecting cavity 31 so as to form a first notch 343. When the controller is mounted, the connecting snap blocks 12 can first be aligned with the first snap-fit slots 341 of the connecting snap slots 34. Then, the connecting post 11 is inserted into the connecting cavity 31, and the connecting snap blocks 12 are simultaneously inserted into the first snap-fit slots 341. Subsequently, the controller is rotated clockwise, and the connecting snap blocks 12 can be smoothly inserted into the second snap-fit slots 342, thereby achieving quick assembly of the two. The process is quick and convenient. Meanwhile, in order to improve the smoothness of assembly of the two, preferably, the bottom of the first notch 343 is an inclined surface that slopes downward toward the interior of the connecting cavity 31; and an inner wall of one side of the first snap-fit slot 341 is an arc surface that protrudes outward.

Further, in this embodiment, a snap protruding block 35 extends downward from an inner wall of the top of the second snap-fit slot 342. The snap-fit protruding block 35 is located in the middle of the inner wall of the top of the second snap-fit slot 342 and forms a limiting cavity with an inner wall of one end of the second snap-fit slot 342. When the controller is rotated clockwise, the connecting snap block 12 can smoothly snap into the limiting cavity. The snap-fit protruding block 35 is capable of limiting the connecting snap block 12, thereby avoiding looseness, and ensuring the stability of connection between the connecting snap block and the limiting cavity.

Further, in this embodiment, the number of the connecting snap blocks 12 is at least two, and the size of one of the connecting snap blocks 12 is greater than the sizes of other connecting snap blocks 12; and the top of the base 3 is further provided with a fool-proof block 36, and the fool-proof block 36 is arranged close to the connecting snap slot 34 adapted to the connecting snap block 12 with the large size. By providing the fool-proof block 36 and setting the size of one of the connecting snap blocks 12 to be large, a fool-proof effect can be achieved, thereby achieving precise circumferential and axial positioning of an interface, and avoiding misalignment during connection. Preferably, four connecting snap blocks 12 and four connecting snap slots 34 are provided. The four connecting snap blocks 12 are distributed on the outer wall of the connecting post 11 at equal intervals in the circumferential direction of the connecting post 11, and the four connecting snap slots 34 are distributed in the inner wall of the connecting cavity 31 at equal intervals in the circumferential direction of the connecting cavity 31.

In an embodiment, a bolt stud 37 is integrally connected to the middle of the bottom of the base 3, and the connecting cavity 31 is formed in the bolt stud 37; an outer wall of the bolt stud 37 is further mounted with a washer 39 and a lock nut 30; and a connecting cable 38 is further connected to the second PCB 32, and the connecting cable 38 penetrates through the bottom of the bolt stud 37 and extends outward. Through the connecting cable 38, the second PCB 32 can be electrically connected to the main control board in the lamp. Meanwhile, the bolt stud 37, the lock nut 30, and the washer 39 are provided, so that the base 3 can be stably mounted on the lamp.

In addition, a controller is further provided, including a mounting housing 6, where the controller further includes the connection cover 1 and the base 3 as above; and the connection cover 1 is mounted or integrated on the mounting housing 6 (i.e., integrated with the mounting housing 6). The type of the controller is not limited. The controller may be a common lighting sensor, a human proximity sensor, or the like on the market. The controller can be quickly connected to the lamp via the connection cover 1 and the base 3.

A lamp is further provided, including the controller as above, where the base 3 is mounted on the lamp housing 5, and the controller is mounted on the base 3 via the connection cover 1. The type of the lamp is not limited. By mounting the base 3 on the lamp, the controller can be quickly electrically connected to the lamp. The process is convenient and fast.

A lamp is further provided, including a lamp housing 5, and the base 3 and the connection cover 1 as above, where the base 3 is integrated on the lamp housing 5 (i.e., the base 3 is integrated with the lamp housing 5, and a corresponding connecting structure similar to that on the base 1 is arranged on the lamp housing 5), and the connection cover 1 is mounted or integrated on the controller (i.e., the connection cover 1 is integrated with the controller, and a corresponding connecting structure similar to that on the connection cover 1 is arranged on the controller); and the base 3 and the connection cover 1 are connected using the electrical connection structure as above.

The above are only preferred embodiments of the present application and are not used to limit the present application. Any modifications, equivalent substitutions and improvements, etc. made within the spirit and principle of the present application shall be included within the scope of protection of the present application.

What is claimed is:

1. A quick electrical connection structure for a controller, comprising:

a connection cover, mounted on the controller, wherein a first PCB is mounted in the controller and is provided with a plurality of connecting pins, a connecting post is integrally connected to the middle of one side of the connection cover, and the plurality of connecting pins penetrate through the bottom of the connecting post and extend outward; and a base, wherein the top of the base is provided with a connecting cavity adapted to the connecting post, a second PCB is further arranged in the connecting cavity and is further provided with a plurality of elastic contact pads, a plurality of connecting snap slots are circumferentially formed in an inner wall of the connecting cavity, a plurality of connecting snap blocks adapted to the connecting snap slots are arranged on an outer wall of the connecting post, the connecting post is inserted into the connecting cavity and snaps into the base via the connecting snap blocks and the connecting snap slots, and when the connection cover snaps into the base via the connecting post, an end part of one end of each of the plurality of connecting pins that penetrate through the bottom of the connecting post abuts against one of the elastic contact pads.

2. The quick electrical connection structure for a controller according to claim 1, wherein each of the connecting snap slots comprises a first snap-fit slot formed vertically on an inner wall thereof and a second snap-fit slot formed circumferentially and horizontally in the inner wall thereof along an inner wall of the connecting cavity; and the second snap-fit slot is in communication with the first snap-fit slot, and one end of the first snap-fit slot penetrates to the top of the connecting cavity so as to form a first notch.

3. The quick electrical connection structure for a controller according to claim 2, wherein the bottom of the first notch is an inclined surface that slopes downward toward the interior of the connecting cavity; and an inner wall of one side of the first snap-fit slot is an arc surface that protrudes outward.

4. The quick electrical connection structure for a controller according to claim 2, wherein a snap protruding block extends downward from an inner wall of the top of the second snap-fit slot.

5. The quick electrical connection structure for a controller according to claim 1, wherein the number of the connecting snap blocks is at least two, and the size of one of the connecting snap blocks is greater than the sizes of other connecting snap blocks.

6. The quick electrical connection structure for a controller according to claim 5, wherein the top of the base is further provided with a fool-proof block, and the fool-proof block is arranged close to the connecting snap slot adapted to the connecting snap block with the large size.

7. The quick electrical connection structure for a controller according to claim 1, wherein a bolt stud is integrally connected to the middle of the bottom of the base, and the connecting cavity is formed in the bolt stud; an outer wall of the bolt stud is further mounted with a washer and a lock nut; and a connecting cable is further connected to the second PCB, and the connecting cable penetrates through the bottom of the bolt stud and extends outward.

8. A controller, comprising a mounting housing, wherein the controller further comprises the connection cover and the base according to claim 1; and the connection cover is mounted or integrated on the mounting housing.

9. A lamp, comprising a lamp housing and the controller according to claim 8, wherein the base is mounted on the lamp housing, and the controller is mounted on the base via the connection cover.

10. A lamp, comprising a lamp housing, and the base and the connection cover according to claim 1, wherein the base is integrated on the lamp housing, and the connection cover is mounted or integrated on the controller; and the base and the connection cover are connected using the electrical connection structure according to claim 1.

* * * * *